United States Patent
Park et al.

(10) Patent No.: US 7,843,446 B2
(45) Date of Patent: Nov. 30, 2010

(54) DIRECT CURRENT TO DIRECT CURRENT CONVERTING CIRCUIT, DISPLAY APPARATUS HAVING THE SAME AND METHOD OF DRIVING THE DIRECT CURRENT TO DIRECT CURRENT CONVERTING CIRCUIT

(75) Inventors: Kee-Chan Park, Anyang-si (KR); Min-Koo Han, Seoul (KR); Woo-Jin Nam, Seongnam-si (KR); Hye-Jin Lee, Seoul (KR)

(73) Assignees: Samsung Electronics Co., Ltd., Suwon-Si (KR); Seoul National University Industry Foundation, Seoul (KR)

( * ) Notice: Subject to any disclaimer, the term of this patent is extended or adjusted under 35 U.S.C. 154(b) by 754 days.

(21) Appl. No.: 11/772,583

(22) Filed: Jul. 2, 2007

(65) Prior Publication Data
US 2008/0122812 A1 May 29, 2008

(30) Foreign Application Priority Data
Jul. 5, 2006 (KR) ........................ 10-2006-0062935

(51) Int. Cl.
*G09G 3/36* (2006.01)
*G09G 5/00* (2006.01)
(52) U.S. Cl. .................. 345/211; 345/87; 345/100
(58) Field of Classification Search ........... 345/98–100, 345/204, 690, 211
See application file for complete search history.

(56) References Cited

U.S. PATENT DOCUMENTS

| 6,897,708 | B2 | 5/2005 | Hamasako |
| 2005/0035811 | A1* | 2/2005 | Shin ........................... 327/536 |
| 2005/0195017 | A1* | 9/2005 | Chen et al. .................. 327/536 |
| 2005/0258810 | A1* | 11/2005 | Lin ............................. 323/282 |
| 2006/0132417 | A1* | 6/2006 | Shigenobu et al. ............ 345/98 |

FOREIGN PATENT DOCUMENTS

| JP | 2003-168288 | 6/2003 |
| JP | 2003-259625 | 9/2003 |
| JP | 2005-333790 | 12/2005 |

\* cited by examiner

*Primary Examiner*—Duc Q Dinh
(74) *Attorney, Agent, or Firm*—F. Chau & Associates, LLC

(57) ABSTRACT

In a DC-DC converting circuit, a charge pumping part receives an input voltage, a first clock and a second clock and outputs first and second voltages to first and second nodes, which are boosted by high voltages of the first and second clocks with respect to the input voltage. An output part is connected to the first and second nodes of the charge pumping part, and a level boosting part turns on or turns off the charge pumping part in response to the first and second clocks. The output part outputs the first and second voltages through an output terminal during a high period of the first clock and during a high period of the second clock, respectively. Thus, an output voltage having a voltage level corresponding to two times that of the input voltage may be output from the output terminal while the first and second clocks are provided.

17 Claims, 7 Drawing Sheets

US 7,843,446 B2

DIRECT CURRENT TO DIRECT CURRENT CONVERTING CIRCUIT, DISPLAY APPARATUS HAVING THE SAME AND METHOD OF DRIVING THE DIRECT CURRENT TO DIRECT CURRENT CONVERTING CIRCUIT

CROSS-REFERENCE TO RELATED APPLICATION

This application relies for priority upon Korean Patent Application No. 2006-62935 filed on Jul. 5, 2006, the contents of which are herein incorporated by reference in its entirety.

BACKGROUND OF THE INVENTION

1. Technical Field

The present disclosure relates to a direct current to direct current (DC-DC) converting circuit, a display apparatus having the same and a method of driving the DC-DC converting circuit. More particularly, the present disclosure relates to a DC-DC converting circuit built in a display panel, a display apparatus having the DC-DC converting circuit and a method of driving the DC-DC con veiling circuit.

2. Discussion of Related Art

In general, a liquid crystal display (LCD) includes a liquid crystal display panel to display images and is classified into a polysilicon (poly-Si) LCD and an amorphous silicon (a-Si) LCD according to the type of thin film transistor included in the liquid crystal display panel.

In the case of the poly-Si LCD, a gate driving circuit that provides a gate signal to the liquid crystal display panel is built into the liquid crystal display panel and includes a polysilicon PMOS transistor. Meanwhile, a data driving circuit that provides a data signal to the liquid crystal panel is built into a driving chip mounted on the liquid crystal display panel as a chip-on-glass structure.

In a conventional driving chip, a timing controller, a memory and a DC-DC converting circuit are built into the driving chip together with the data driving circuit. In order to prevent a high voltage from being applied to the driving chip, however, a structure in which parts of the DC-DC circuit that generate a driving voltage for the gate driving circuit are built in the liquid crystal display panel has been developed.

In a conventional structure, a DC-DC converting circuit built into a liquid crystal display panel includes only polysilicon PMOS transistors in order to simplify the manufacturing process of the liquid crystal display panel. Such a conventional DC-DC converting circuit includes two polysilicon PMOS transistors, each of which has a diode-connected structure and a capacitor coupled to a clock signal to pump up a supplied voltage.

A voltage drop of an output voltage occurs due to a threshold voltage in the conventional DC-DC converting circuit, however, and the more the number of pumping circuits increases, the more the voltage drop of the output voltage increases. Moreover, electric power efficiency is about 50% or less, and the electric power efficiency becomes lower when the voltage level of the output voltage or the number of the pumping circuits increases.

SUMMARY OF THE INVENTION

Exemplary embodiments of the present invention provide a DC-DC converting circuit capable of improving output characteristics and electric power efficiency.

Exemplary embodiments of the present invention also provide a display apparatus having the above DC-DC converting circuit.

Exemplary embodiments of the present invention also provide a method of driving the above DC-DC converting circuit.

In one exemplary embodiment of the present invention, a DC-DC converting circuit includes a charge pumping part, an output part, and a level boosting part.

The charge pumping part receives an input voltage, a first clock and a second clock having a phase opposite to the first clock that are externally supplied, outputs a first voltage boosted by a high voltage of the first clock with respect to the input voltage during a high period of the first clock and outputs a second voltage boosted by a high voltage of the second clock with respect to the input voltage during a high period of the second clock. The output part outputs the first voltage from the charge pumping part to an output terminal during the high period of the first clock and outputs the second voltage from the charge pumping part to the output terminal during a high period of the second clock. The level boosting part controls a drive of the charge pumping part in response to the first clock and the second clock.

In an exemplary embodiment of the present invention, a DC-DC converting circuit includes N boosting circuits (N is a constant number larger than 2), and each of the boosting circuits includes a charge pumping part, an output part, and a level boosting part.

The charge pumping part receives an input voltage, a first clock and a second clock having a phase opposite to the first clock that are externally supplied, outputs a first voltage boosted by a high voltage of the first clock with respect to the input voltage during a high period of the first clock and outputs a second voltage boosted by a high voltage of the second clock with respect to the input voltage during a high period of the second clock. The output part outputs the first voltage from the charge pumping part to an output terminal during a high period of the first clock and outputs the second voltage from the charge pumping part to the output terminal during a high period of the second clock. The level boosting part controls a drive of the charge pumping part in response to the first clock and the second clock.

The input terminals of N-(N−1)th to N-th boosting circuits among the N boosting circuits are connected to an output terminal of a previous boosting circuit to receive an output of the previous boosting circuit as the input voltage.

In an exemplary embodiment of the present invention, a DC-DC converting circuit includes a charge pumping part, an output part, and a level boosting part. The charge pumping part receives an input voltage, a first clock and a second clock having a phase opposite to the first clock from an exterior, outputs a first voltage lowered by a low voltage of the first clock with respect to the input voltage during a low period of the first clock and outputs a second voltage lowered by a low voltage of the second clock with respect to the first voltage during a low period of the second clock. The output part outputs the first voltage from the charge pumping part to an output terminal during the low period of the first clock and outputs the second voltage from the charge pumping part to the output terminal during the low period of the second clock. The level boosting part controls a drive of the charge pumping part in response to the first clock and the second clock.

According to an exemplary embodiment of the present invention, a display apparatus includes an array substrate, an opposite substrate combined with the array substrate, and a driving chip mounted on the array substrate. The array substrate includes a base substrate, a pixel array, a gate driving circuit and a first DC-DC converting circuit. The pixel array is formed onto the base substrate to display an image in response to a gate signal and a data signal. The gate driving circuit is formed onto the base substrate and adjacent the pixel array to generate the gate signal. The first DC-DC converting circuit is formed onto the base substrate to boost an input voltage to a first driving voltage for the gate driving circuit and outputs the first driving voltage. The driving chip includes a timing controller, a memory, a data driving circuit, and a second DC-DC converting circuit. The driving chip provides the data signal a gate control signal, and the input voltage to the pixel array, the gate driving circuit, and the first DC-DC converting circuit, respectively.

The first DC-DC converting circuit includes a charge pumping part, an output part, and a level boosting part. The charge pumping part receives the input voltage, a first clock and a second clock having a phase opposite to the first clock, outputs a first voltage boosted by a high voltage of the first clock with respect to the input voltage during a high period of the first clock and outputs a second voltage boosted by a high voltage of the second clock with respect to the input voltage during a high period of the second clock. The output part outputs the first voltage from the charge pumping part to an output terminal as the first driving voltage during a high period of the first clock and outputs the second voltage from the charge pumping part to the output terminal as the first driving voltage during a high period of the second clock. The level boosting part controls a drive of the charge pumping part in response to the first clock and the second clock.

In an exemplary embodiment of the present invention, a method of driving a DC-DC converting circuit is provided as follows. When an input voltage and first and second clocks having a phase opposite to each other are externally supplied, an electric potential of a first node is boosted to a first voltage by a high voltage of the first clock with respect to the input voltage in response to the first clock during a high period of the first clock and a low period of the second clock. The electric potential of the first node boosted by the first voltage is output to an output terminal in response to an electric potential of a second node controlled by the second clock. The electric potential of the second node is boosted to a second voltage by a high voltage of the second clock with respect to the input voltage in response to the second clock during a low period of the first clock and a high period of the second clock. The electric potential of the second node boosted to the second voltage is output to the output terminal in response to the electric potential of the first node controlled by the first clock.

In accordance with an exemplary embodiment of the present invention, a method of driving a DC-DC converting circuit is provided as follows. When an input voltage and first and second clocks having a phase opposite to each other are externally supplied, an electric potential of a first node is lowered to a first voltage by a low voltage of the first clock with respect to the input voltage in response to the second clock during a low period of the first clock and a high period of the second clock. The electric potential of the first node lowered to the first voltage is output to an output terminal in response to the first clock during the low period of the first clock. An electric potential of a second node is lowered to a second voltage by a low voltage of the second clock with respect to the input voltage in response to the first clock during a high period of the first clock and a low period of the second clock. The electric potential of the second node lowered to the second voltage is output in response to the second clock during the low period of the second clock.

According to the above-described exemplary embodiment of the present invention, the DC-DC converting circuit generates the output voltage that is boosted to have a voltage level corresponding to two times that of the input voltage using the level boosting part, so that the electric power efficiency of the DC-DC converting circuit may be improved, and an output voltage drop caused by a threshold voltage may be prevented.

BRIEF DESCRIPTION OF THE DRAWINGS

Exemplary embodiments of the present invention will be understood in more detail from the following descriptions taken in conjunction with the accompanying drawings, in which.

DETAILED DESCRIPTION OF EXEMPLARY EMBODIMENTS

Figure 1:
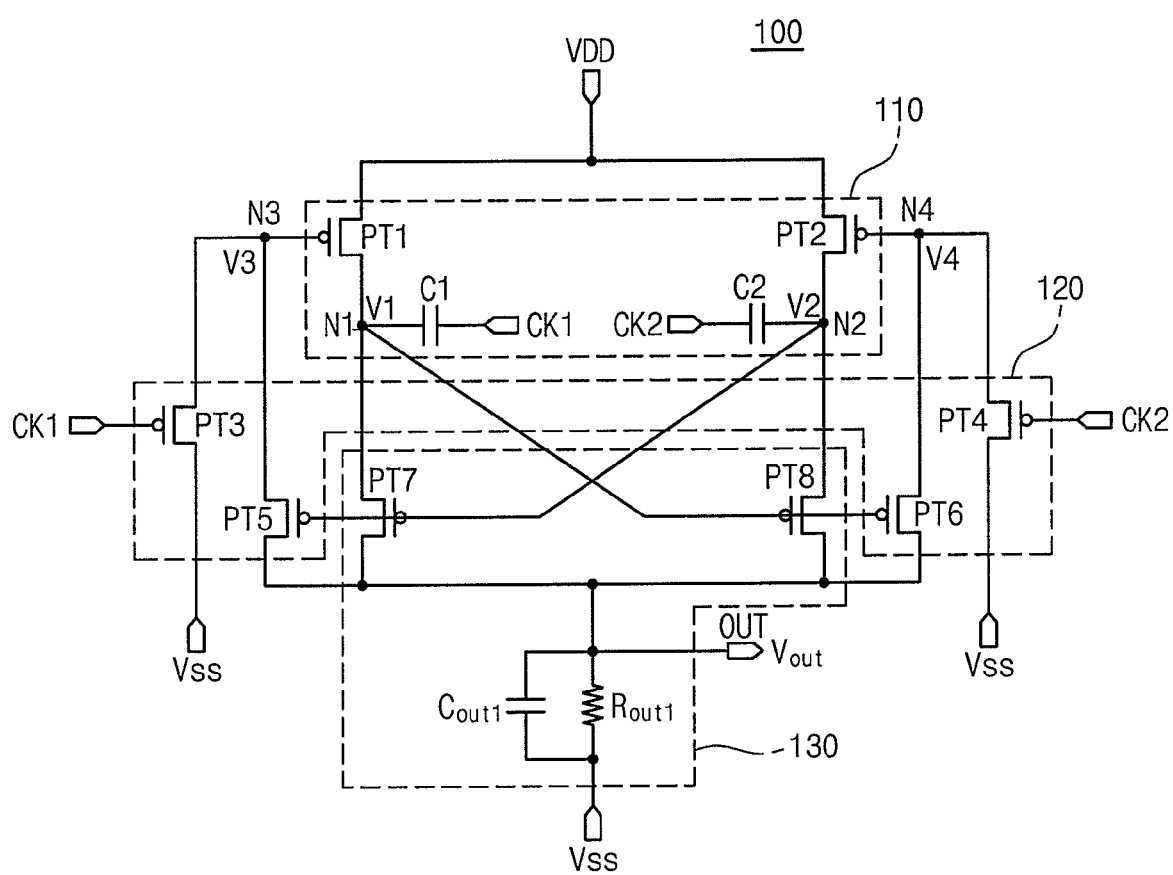
FIG. 1 is a circuit diagram showing an exemplary embodiment of a DC-DC converting circuit according to the present invention.

FIG. 1 is a circuit diagram showing an exemplary embodiment of a DC-DC converting circuit according to the present invention.

Referring to FIG. 1, a DC-DC converting circuit 100 includes a charge pumping part 110, a level boosting part 120, and an output part 130.

The charge pumping part 110 includes a first transistor PT1, a second transistor PT2, a first flying capacitor C1 and a second flying capacitor C2 and receives an input voltage VDD, a first clock CK1 and a second clock CK2 having a phase opposite to the first clock CK1 from an exterior of the circuit 100. In this exemplary embodiment, the first clock CK1 and the second clock CK2 have a frequency of about 500 kHz.

The charge pumping part 110 outputs a first voltage V1 boosted by a high voltage of the first clock CK1 with respect to the input voltage VDD during a high period of the first clock CK1 and outputs a second voltage V2 boosted by a high voltage of the second clock CK2 with respect to the input voltage VDD during a high period of the second clock CK2.

More specifically, the first transistor PT1 includes an input electrode receiving the first voltage VDD, a control electrode connected to the level boosting part 120, and an output electrode connected to a first node N1. The first flying capacitor C1 includes a first terminal receiving the first clock CK1 and a second terminal connected to the first node N1. The second transistor PT2 includes an input electrode receiving the input voltage VDD, a control electrode connected to the level boosting part 120, and an output electrode connected to a second node N2. The second flying capacitor C2 includes a first terminal receiving the second clock CK2 and a second terminal connected to the second node N2. The first voltage V1 is corresponding to an electric potential at the first node N1 and the second voltage V2 is corresponding to an electric potential at the second node N2.

In this exemplary embodiment, the input voltage VDD has a voltage level equal to those of the high voltages of the first clock CK1 and the second clock CK2, therefore, the first voltage V1 and the second voltage V2 have a voltage level that corresponds to two times that of the input voltage VDD.

Further, each of the first and second transistors PT1 and PT2 has a channel length of about 350 μm and a channel width of about 4 μm, and each of the first and second flying capacitors C1 and C2 has a capacitance of about 800 pF.

The output part 130 outputs the first voltage V1 from the charge pumping part 110 to an output terminal OUT during the high period of the first clock CK1 and outputs the second voltage V2 from the charge pumping part 110 to the output terminal OUT during the high period of the second clock CK2. The level boosting part 120 controls a drive of the charge pumping part 110 and the output part 130 in response to the first clock CK1 and the second clock CK2.

More specifically, the level boosting part 120 includes third, fourth, fifth and sixth transistors PT3, PT4, PT5 and PT6. The third transistor PT3 includes an input electrode receiving a ground voltage VSS, a control electrode receiving the first clock CK1 and an output electrode connected to the control electrode of the first transistor PT1. The control electrode of the first transistor PT1 is labeled node N3. The fourth transistor PT4 includes an input electrode receiving the ground voltage VSS, a control electrode receiving the second clock CK2 and an output electrode connected to the control electrode of the second transistor PT2. The control electrode of the second transistor is labeled node N4. The fifth transistor PT5 includes an input electrode connected to the third node N3, a control electrode connected to the second node N2 and an output electrode connected to the output terminal OUT. The sixth transistor PT6 includes an input electrode connected to the fourth node N4, a control electrode connected to the first node N1 and an output electrode connected to the output terminal OUT.

In this exemplary embodiment, each of the third and fourth transistors PT3 and PT4 has a channel length of about 8 μm and a channel width of about 4 μm, and each of the fifth and sixth transistors PT5 and PT6 has a channel length of about 100 μm and a channel width of about 4 μm.

The output part 130 includes a seventh transistor PT7 and an eighth transistor PT8. The seventh transistor PT7 includes an input electrode connected to the first node N1, a control electrode connected to the second node N2 and an output electrode connected to the output terminal OUT. The eighth transistor PT8 includes an input electrode connected to the second node N2, a control electrode connected to the first node N1 and an output electrode connected to the output terminal OUT. The output part 130 further includes an output capacitor Cout1 and an output resistor Rout1 connected between the output terminal OUT and the ground voltage VSS.

In this exemplary embodiment, each of the seventh and eighth transistors PT7 and PT8 has a channel width of about 350 μm and a channel width of about 4 μm, and the output capacitor Cout1 has a capacitance of about 10 nF.

The first to eighth transistors PT1~PT8 have a threshold voltage of about −1.5V, and the first to eighth transistors PT1~PT8 are formed as polysilicon PMOS transistors.

Hereinafter, operations and functions of the DC-DC converting circuit 100 shown in FIG. 1 will be described in detail.

Figure 2:
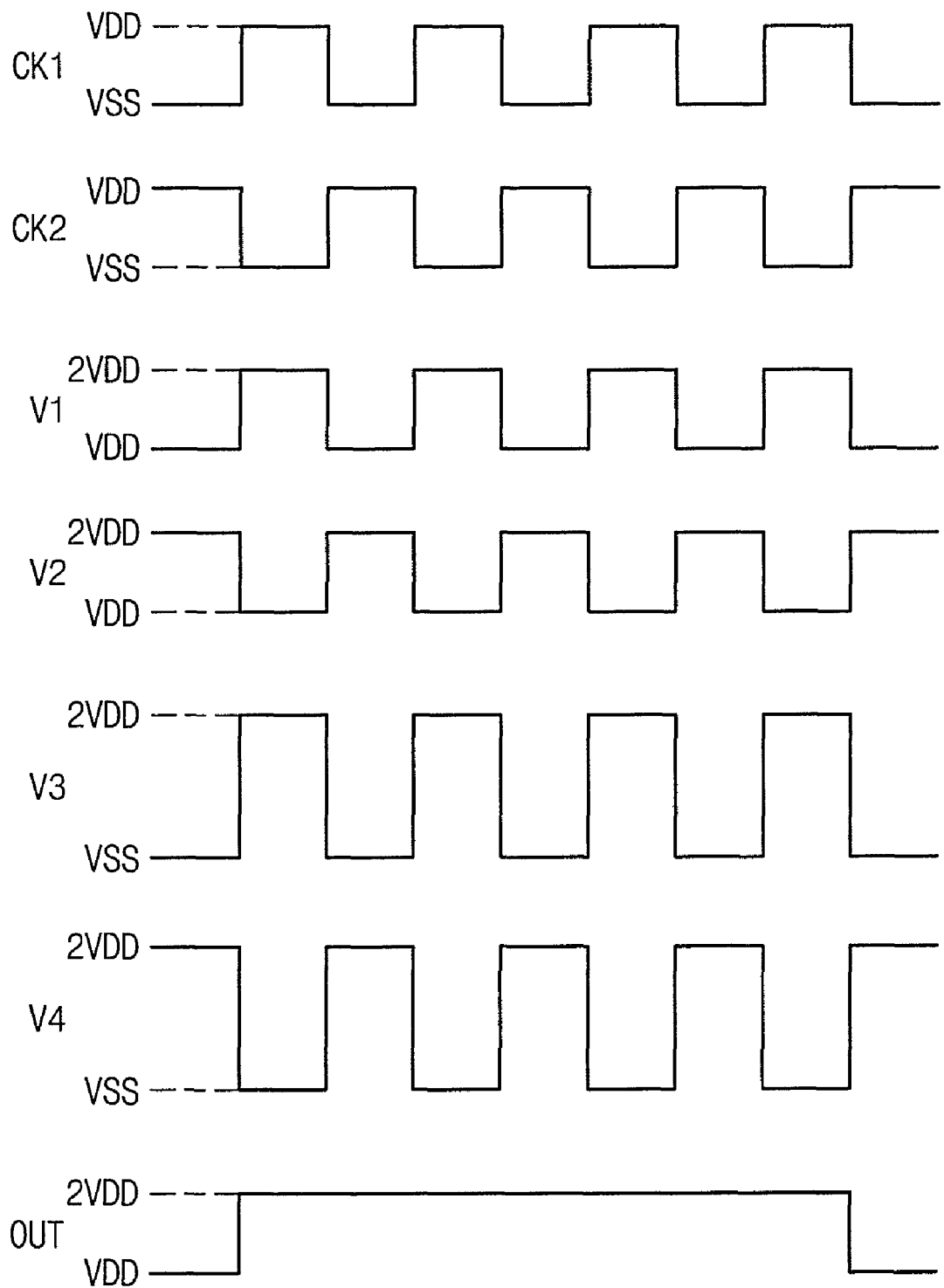
FIG. 2 is a timing diagram showing waveforms of first and second clocks, first and second voltages, electric potentials of third and fourth nodes and an output voltage shown in FIG. 1.

FIG. 2 is a timing diagram showing waveforms of first and second clocks, first and second voltages, electric potentials of third and fourth nodes and the output voltage of FIG. 1.

Referring to FIGS. 1 and 2, when the first clock CK1 is in a low state and the second clock CK2 is in a high state, the fifth transistor PT5 is turned off by the electric potential of the second node N2 and the third transistor PT3 is turned on in response to the first clock CK1, so that the electric potential of the third node N3 is lowered to the ground voltage VSS, for instance, 0V. Then, the first transistor PT1 is turned on to provide the input voltage VDD to the first node N1.

When the fourth transistor PT4 is turned off in response to the second clock CK2 and the sixth transistor PT6 is turned on by the electric potential V1 of the first node N1, an electric potential V4 of the fourth node N4 that is maintained at the ground voltage VSS during a previous period is boosted to an output voltage 2 VDD having a voltage level corresponding to two times that of the input voltage VDD, and the second transistor PT2 is turned off by the boosted electric potential V4 of the fourth node N4. Thus, the electric potential V2 of the second node N2 maintained at the input voltage VDD during the previous period, that is, maintained at the second voltage V2, is boosted to a voltage corresponding to the output voltage 2 VDD by the second flying capacitor C2. The voltage at the second node N2, which corresponds to two times that of the input voltage VDD, is obtained by adding the high voltage of the second clock CK2 to the input voltage VDD.

Then, the eighth transistor PT8 is turned on by the electric potential of the first node N1, and the second voltage V2 is output to the output terminal OUT of the DC-DC converting circuit 100. Thus, an output voltage Vout output through the output terminal OUT has a voltage level corresponding to two times that of the input voltage VDD.

When the second clock CK2 is in a low state and the first clock CK1 is in a high state, the sixth transistor PT6 is turned off by the electric potential of the first node N1 and the fourth transistor PT4 is turned on in response to the second clock CK2, so that the electric potential of the fourth node N4 is lowered to the ground voltage VSS, for instance, 0V. Then, the second transistor PT2 is turned on to boost the electric potential of the second node N2 to the input voltage VDD.

When the third transistor PT3 is turned off in response to the first clock CK1 and the fifth transistor PT5 is turned on by the electric potential V2 of the second node N2, the electric potential V3 of the third node N3 that was maintained at the ground voltage VSS during the previous period is boosted to a voltage 2 VDD having a voltage level corresponding to two times that of the input voltage VDD. Then, the first transistor PT1 is turned off by the boosted electric potential V3 of the third node N3. Thus, the electric potential of the first node N1 maintained at the input voltage VDD during the previous period, that is, maintained at the first voltage V1, is boosted to the voltage 2 VDD by the first flying capacitor C1. The voltage 2 VDD, which corresponds to two times that of the input voltage VDD, is obtained by adding the high voltage of the first clock CK1 to the input voltage VDD.

Then, the seventh transistor PT7 is turned on by the electric potential of the second node N2 and the first voltage V1 is output to the output terminal OUT of the DC-DC converting circuit 100. Thus, the output voltage Vout output through the output terminal OUT has a voltage level corresponding to two times that of the input voltage VDD. Consequently, the output voltage Vout having the voltage 2 VDD corresponding to two times that of the input voltage VDD may be continuously output to the output terminal OUT of the DC-DC converting circuit 100 while the first clock CK1 and the second clock CK2 are provided.

The maximum electric power efficiency of the DC-DC converting circuit in this exemplary embodiment is measured at about 77% and, particularly, the electric power efficiency is measured at about 69% when an output voltage of about 9V is output.

When the threshold voltages of the first to eighth transistors PT1~PT8 are varied from −1.1V to −1.7V, the difference between the reference output voltage, that is, an output voltage of −1.1V Vout0, and the output voltage Vout is in a range from about 0% to about 2% with respect to the reference output voltage Vout. Thus, the DC-DC converting circuit 100 may have an improved electric power efficiency and may prevent the drop of the output voltage due to the threshold voltage.

Figure 3:
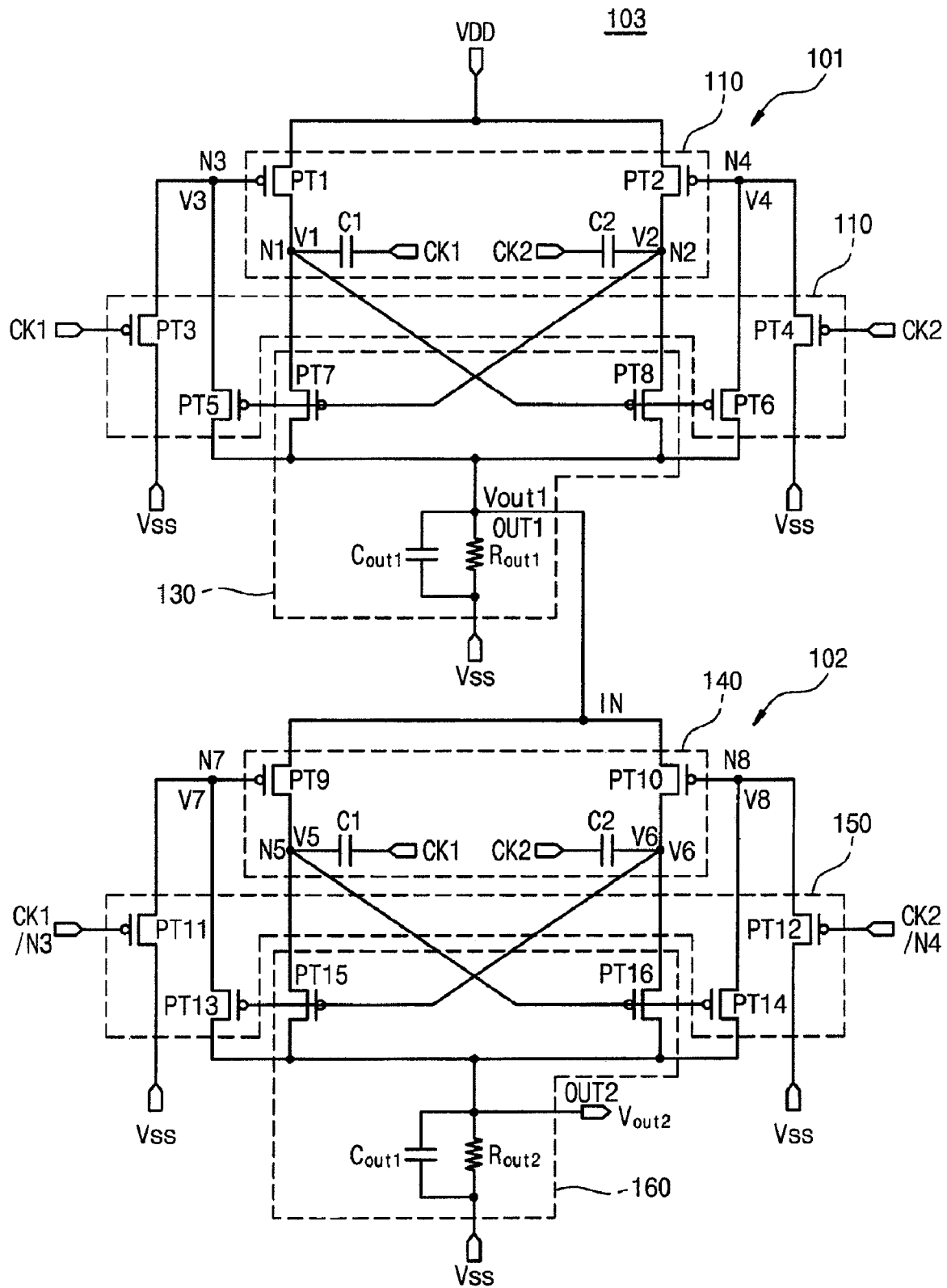
FIG. 3 is a circuit diagram showing a DC-DC converting circuit according to an exemplary embodiment of the present invention.

FIG. 3 is a circuit diagram showing a DC-DC converting circuit according to an exemplary embodiment of the present invention. In FIG. 3, the same reference numerals denote the same elements as in FIG. 1 and, thus, detailed descriptions of the same elements will be omitted.

Referring to FIG. 3, a DC-DC converting circuit 103 includes a first boosting circuit 101 and a second boosting circuit 102. The first boosting circuit 101 and the second boosting circuit 102 have the same configuration as the level boosting circuit 120 shown in FIG. 1, so detailed descriptions of the first and second boosting circuits 101 and 102 will be omitted in order to avoid redundancy.

The second boosting circuit 102 includes a charge pumping part 140, a level boosting part 150, and an output part 160. The charge pumping part 140 includes a ninth transistor PT9, a tenth transistor PT10, a third flying capacitor C3 and a fourth flying capacitor C4. The level boosting part 150 includes eleventh, twelfth, thirteenth and fourteenth transistors PT11, PT12, PT13 and PT14, and the output part 160 includes a fifteenth transistor PT15, a sixteenth transistor PT16, a second output capacitor Cout2 and a second output resistor Rout2.

The first boosting circuit 101 outputs a voltage VDD input from an exterior of the circuit as a first output voltage Vout1 having a voltage level corresponding to two times that of the input voltage VDD, and an input terminal IN of the second boosting circuit 102 is connected to an output terminal OUT1 of the first boosting circuit 101 to receive the first output voltage Vout1. The second boosting circuit 102 sequentially adds high voltages of the second and first clocks CK2 and CK1 to the first output voltage Vout1 during high periods of the first and second clocks CK1 and CK2, respectively, to thereby output a second output voltage Vout2 that is boosted by the high voltages in comparison with the first output voltage Vout1. Thus, the second output voltage Vout2 may have a voltage level 3 VDD that is higher by approximately three times that of the input voltage VDD.

As shown in FIG. 3, the first clock CK1 and the second clock CK2 may be directly provided to the control electrodes of the eleventh and twelfth transistors PT11 and PT12, respectively. According to an exemplary embodiment of the present invention, however, the eleventh transistor PT11 and the twelfth transistor PT12 may receive the first clock CK1 and the second clock CK2, respectively, through the first boosting circuit 101. More specifically, the control electrode of the eleventh transistor PT11 is connected to a third node N3 of the first boosting circuit 101 and the control electrode of the twelfth transistor PT12 is connected to a fourth node N4 of the first boosting circuit 101, so that the level boosting part 150 of the second boosting circuit 102 receives the first clock CK1, shown at CK1/N3, and the second clock CK2, shown at CK2/N4, through the first boosting circuit 101.

In FIG. 3, although the DC-DC converting circuit 103 having two boosting circuits has been shown, the DC-DC converting circuit may include more than N (N is a constant number larger than 3) boosting circuits that have the same configuration and are connected to each other one after another such that an output terminal of each boosting circuit is connected to an input terminal of a next boosting circuit. In this case, the DC-DC converting circuit may generate an output voltage having a voltage level corresponding to N times with respect to the input voltage VDD.

Figure 4:
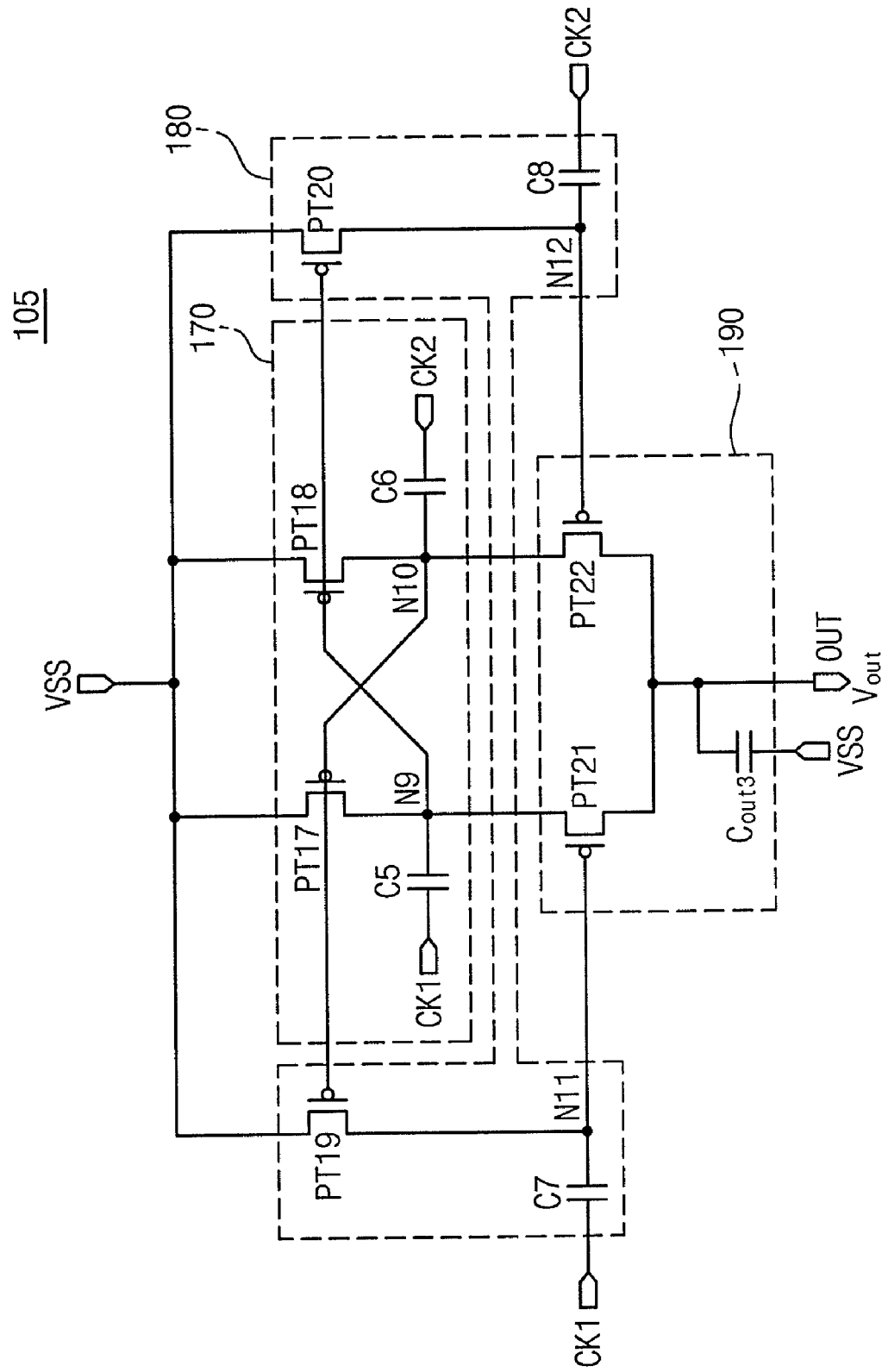
FIG. 4 is a circuit diagram showing a DC-DC converting circuit according to an embodiment of the present invention.

FIG. 4 is a circuit diagram showing a DC-DC converting circuit according to an exemplary embodiment of the present invention.

Referring to FIG. 4, the DC-DC converting circuit 105 includes a charge pumping part 170, a level boosting part 180, and an output part 190.

The charge pumping part 170 includes a seventeenth transistor PT17, an eighteenth transistor PT18, a fifth flying capacitor C5, and a sixth flying capacitor C6. The level boosting part 180 includes a nineteenth transistor PT19, a twentieth transistor PT20, a seventh flying capacitor C7, and an eighth flying capacitor C8. The output part 190 includes a twenty-first transistor PT21, a twenty-second transistor PT22, and an output capacitor Cout3.

Particularly, the seventeenth transistor PT17 includes a control electrode connected to a tenth node N10, an input electrode connected to an input terminal to which a ground voltage VSS is applied, and an output electrode connected to a ninth node N9. The eighteenth transistor PT18 includes a control electrode connected to the ninth node N9, an input electrode connected to the input terminal, and an output electrode connected to the tenth node N10. The seventh flying capacitor C7 is connected between the ninth node N9 and a first clock terminal to which a first clock CK1 is applied, and the eighth flying capacitor C8 is connected between the tenth node N10 and a second clock terminal to which a second clock CK2 is applied.

The nineteenth transistor PT19 includes a control electrode connected to the tenth node N10, an input electrode connected to the input terminal, and an output electrode connected to an eleventh node N11. The twentieth transistor PT20 includes a control electrode connected to the ninth node N9, an input electrode connected to the input terminal, and an output electrode connected to a twelfth node N12. The ninth flying capacitor C9 is connected between the eleventh node N11 and the first clock terminal, and the tenth flying capacitor C10 is connected between the twelfth node N12 and the second clock terminal.

The twenty-first transistor PT21 includes a control electrode connected to the eleventh node N11, an input electrode connected to the ninth node N9, and an output electrode connected to an output terminal OUT from which an output voltage Vout is output. The twenty-second transistor PT22 includes a control electrode connected to the twelfth node N12, an input electrode connected to the tenth node N10, and an output electrode connected to the output terminal OUT. The output capacitor Cout3 is connected between the output terminal OUT and the input terminal to which the ground voltage VSS is applied.

Figure 5:
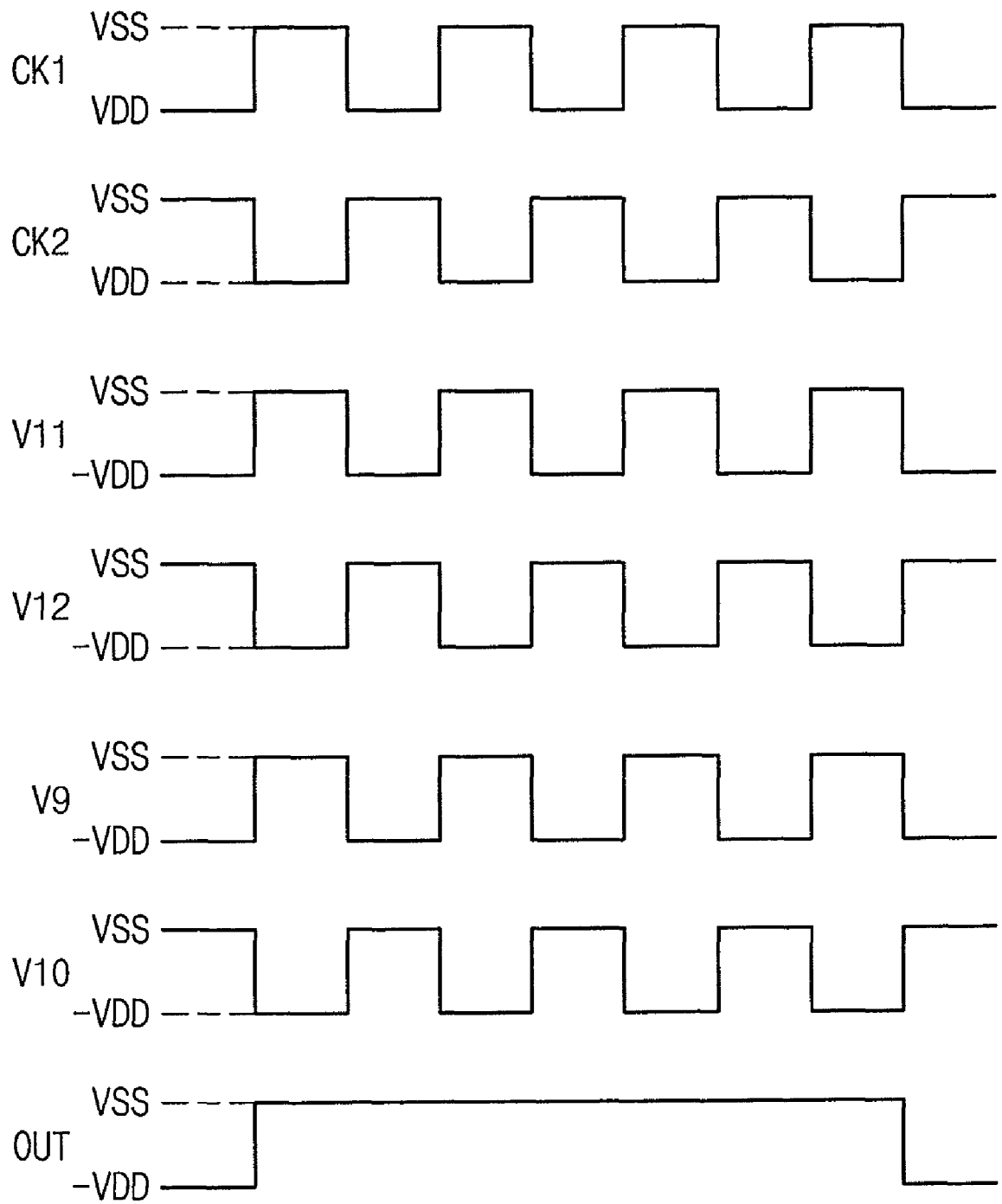
FIG. 5 is a timing diagram showing waveforms of first and second clocks, first and second voltages, electric potentials of third and fourth nodes and an output voltage shown in FIG. 4.

FIG. 5 is a timing diagram showing waveforms of first and second clocks, first and second voltages, electric potentials of third and fourth nodes and the output voltage of FIG. 4.

Referring to FIGS. 4 and 5, when the first clock CK1 is in a low state and the second clock CK2 is in a high state, the twenty-second transistor PT22 is turned off by an electric potential of the twelfth node N12, and an electric potential (hereinafter, referred to as a first voltage V9) of the ninth node N9 that is maintained at the ground voltage VSS, for instance 0V, during a previous period is lowered to a low voltage −VDD of the first clock CK1 by the first clock CK1.

When an electric potential (hereinafter, referred to as a second voltage V10) of the tenth node N10 that is maintained at the low voltage −VDD during the previous period is boosted to the ground voltage VSS by a high voltage of the second clock CK2, and eighteenth and twentieth transistors PT18 and PT20 are turned on by the first voltage V9, and the second voltage V10 is maintained at the ground voltage VSS.

Then, the twenty-first transistor PT21 is turned on by the first clock CK1, so that the first voltage V9 is output to the output terminal OUT through the twenty-first transistor PT21. Thus, a voltage Vout output through the output terminal OUT has a voltage level of −VDD that is lower than the input voltage VSS.

When the first clock CK1 is in a high state and the second clock CK2 is in a low state, the twenty-first transistor PT21 is turned off by an electric potential of the eleventh node N11, and the second voltage V10 that is maintained at the ground voltage VSS during the previous period is lowered to a low voltage −VDD of the second clock CK2 by the second clock CK2.

When the first voltage V9 that is maintained at the low voltage −VDD during the previous period is boosted to the ground voltage VSS by a high voltage of the first clock CK1 and the seventeenth and nineteenth transistors PT17 and PT19 are turned on by the second voltage V10, the first voltage V9 is maintained at the ground voltage VSS.

Then, the twenty-second transistor PT22 is turned on by the second clock CK2, so that the second voltage V10 is output to the output terminal OUT through the twenty-second transistor PT22. Thus, the voltage Vout output through the output terminal OUT has the voltage level of −VDD that is lower than the input voltage VSS.

As a result, the output voltage Vout having the voltage level of −VDD that is lower than the input voltage VDD may be continuously output to the output terminal OUT of the DC-DC converting circuit 105 while the first clock CK1 and the second clock CK2 are provided.

Figure 6:
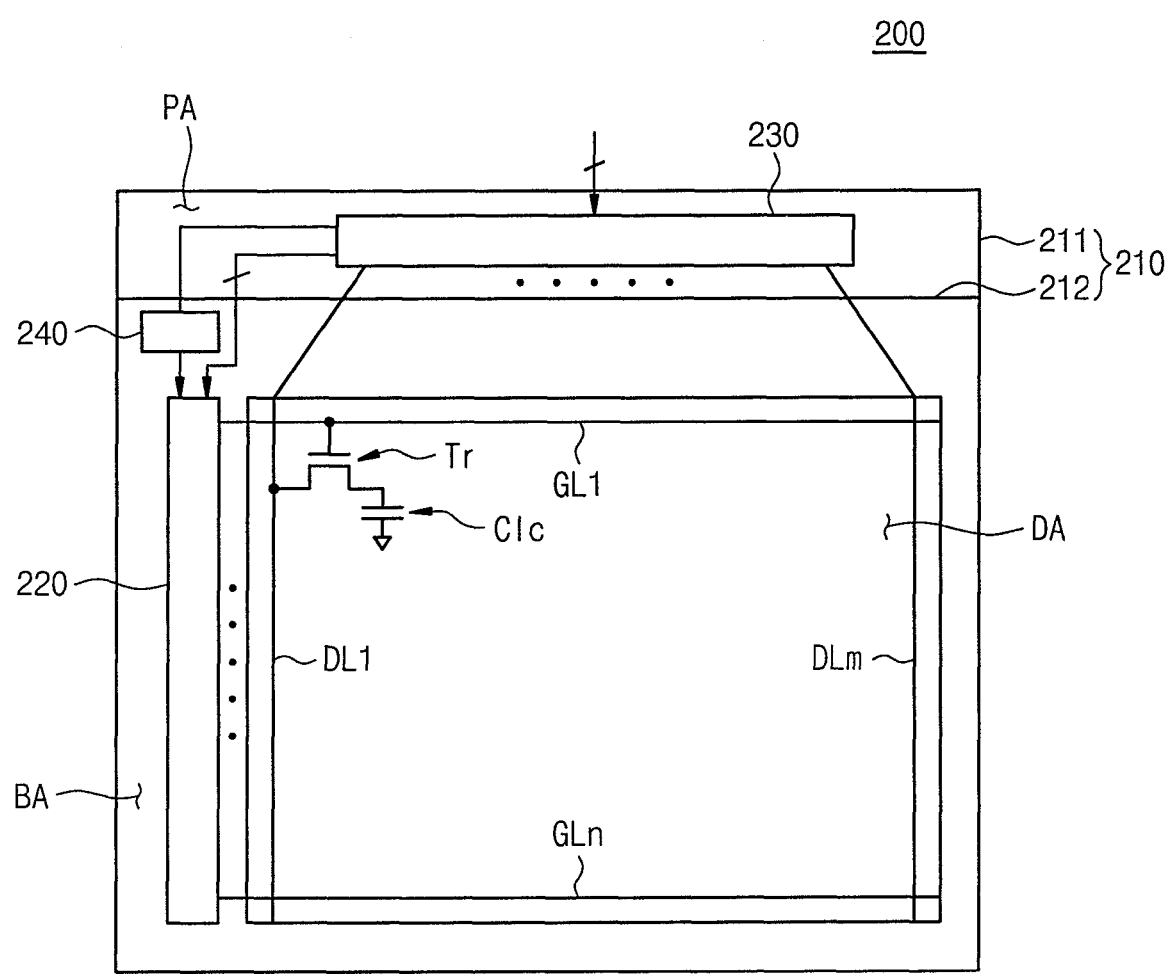
FIG. 6 is a plan view showing a display apparatus having the DC-DC converting circuit of FIG. 1.
Figure 7:
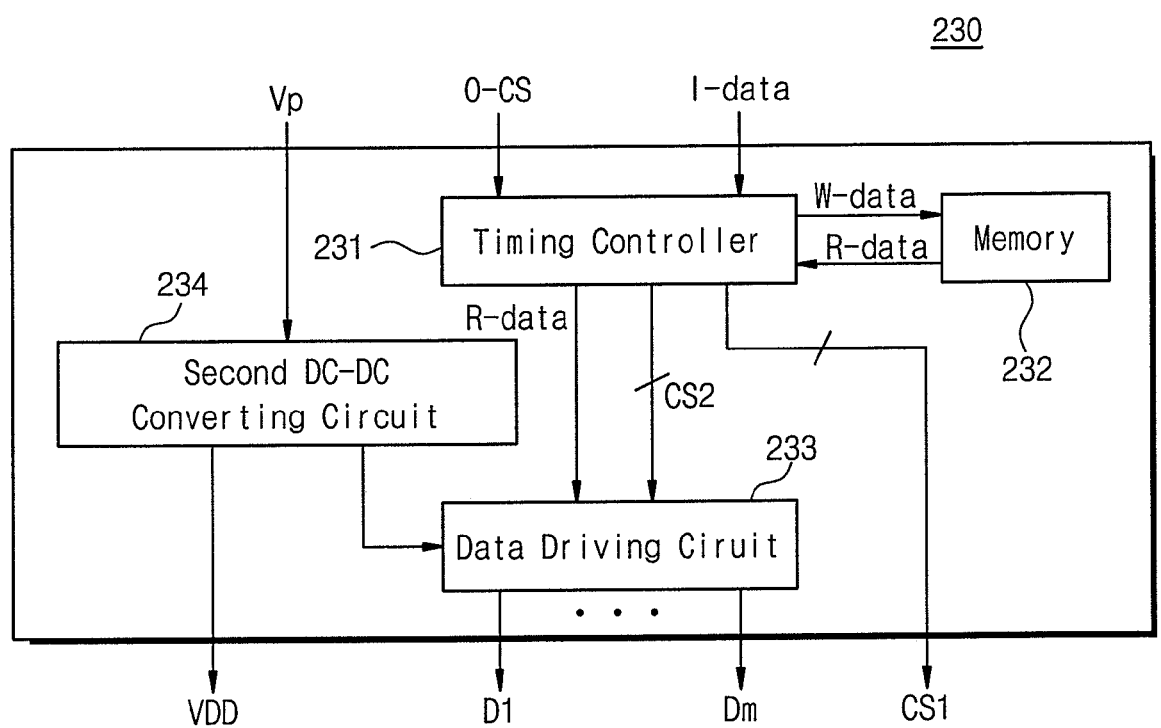
FIG. 7 is a block diagram showing a driving chip of FIG. 6.

FIG. 6 is a plan view showing a display apparatus according to an exemplary embodiment of the present invention, and FIG. 7 is a block diagram showing a driving chip used in the apparatus shown in FIG. 6.

Referring to FIG. 6, a display apparatus 200 includes a display panel 210, a gate driving circuit 220, a driving chip 230, and a first DC-DC converting circuit 240.

The display panel 210 includes an array substrate 211, a color filter substrate 212 facing the array substrate 211, and a liquid crystal layer (not shown) interposed between the array substrate 211 and the color filter substrate 212 to display an image. The display panel 210 includes a display area DA on which the image is displayed, a black matrix area BA surrounding the display area DA, and a peripheral area PA adjacent to the black matrix area BA.

The array substrate 211 includes a plurality of gate lines GL1~GLn and a plurality of data lines DL1~DLm that are formed in the display area DA. In the display area DA, a plurality of pixel areas are defined in a matrix configuration by intersections of the gate lines GL1~GLn and the data lines DL1~DLm. Each of the pixel areas includes a thin film transistor Tr and a liquid crystal capacitor Clc connected to the thin film transistor Tr. More specifically, in a first pixel area, the thin film transistor Tr includes a gate electrode connected to a first gate line GL1, a source electrode connected to a first data line DL1 and a drain electrode connected to the liquid crystal capacitor Clc.

The gate driving circuit 220 and the first DC-DC converting circuit 240 are formed in the black matrix area BA. More specifically, the gate driving circuit 220 is formed adjacent first ends of the gate lines GL1~GLn and sequentially applies a gate signal to the gate lines GL1~GLn to turn on the thin film transistor Tr connected to each of the gate lines GL1~GLn.

In this exemplary embodiment, the gate driving circuit 220 and the first DC-DC converting circuit 240 are substantially simultaneously formed onto the array substrate 211 through the thin film process. The transistors for the gate driving circuit 220 and the first DC-DC converting circuit 240 are polysilicon PMOS transistors. Thus, the process to form the gate driving circuit 220 and the first DC-DC converting circuit 240 onto the array substrate 211 may be simplified. The DC-DC converting circuit 240 can have the same configuration as the DC-DC converting circuit 100 shown in FIG. 1.

The driving chip 230 is mounted on the peripheral area PA. First ends of the data lines DL1~DLm are extended to the black matrix area BA and the peripheral area PA and are electrically connected to the driving chip 230.

As shown in FIG. 7, the driving chip 230 includes a timing controller 231, a memory 232, a data driving circuit 233, and a second DC-DC converting circuit 234.

The timing controller 231 receives a control signal O-CS and image data I-data that are externally supplied, and stores the image data I-data to the memory 232 (W-data) in response to the control signal O-SC or reads out the stored image data I-data from the memory 232 (R-data) in a line unit or a frame unit. Also, the timing controller 231 outputs a gate control signal CS1 and a data control signal CS2 in response to the control signal O-CS.

The gate control signal CS1 is provided to the gate driving circuit 220 shown in FIG. 6. Thus, the gate driving circuit 220 sequentially generates the gate signal in response to the gate control signal CS1. The data control signal CS2 is provided to the data driving circuit 233. Thus, the data driving circuit 233 receives the data control signal CS2 and the read-out image data R-data from the timing controller 231 and changes the read-out image data R-data into data signals D1~Dm to provide the data signals D1~Dm to the data lines DL1~DLm.

The second DC-DC converting circuit 234 receives an externally supplied power supply voltage Vp and outputs an input voltage VDD. Then, the input voltage VDD is output from the driving chip 230 and provided to the first DC-DC converting circuit 240 formed onto the array substrate 211. The first DC-DC converting circuit 240 boosts the input voltage VDD and generates an output voltage having a voltage level corresponding to two times that of the input voltage VDD. The output voltage output from the first DC-DC converting circuit 240 is provided to drive the gate driving circuit 220.

According to the above-described exemplary embodiment, since the level boosting part boosts the input voltage to generate the output voltage having a voltage level that corresponds to two times the input voltage, the electric power efficiency of the DC-DC converting circuit may be improved and a drop of the output voltage due to the threshold voltage may be prevented. More specifically, even when the DC-DC converting circuit includes more than three pumping circuits in order to boost the voltage level of the output voltage to a voltage level corresponding to three times that of the input voltage, the DC-DC converting circuit may prevent a drastic decrease of the electric power efficiency and a drastic voltage drop of the output voltage thereof.

Also, since the transistors of the DC-DC converting circuit are formed of polysilicon PMOS transistors the same as those of the gate driving circuit, the process to form the gate driving circuit and the DC-DC converting circuit onto the array substrate may be simplified.

Although exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A DC-DC converting circuit comprising:
a charge pumping part receiving an input voltage, a first clock and a second clock having a phase different than a phase of the first clock to output a first voltage boosted by a high voltage of the first clock with respect to the input voltage during a high period of the first clock and output a second voltage boosted by a high voltage of the second clock with respect to the input voltage during a high period of the second clock;
an output part outputting the first voltage from the charge pumping part to an output terminal during a low period of the second clock and outputting the second voltage from the charge pumping part to the output terminal during a low period of the first clock; and
a level boosting part providing an output voltage or a ground voltage from the output terminal to the charge pumping part to turn on or to turn off the charge pumping part in response to the first clock and the second clock, wherein the charge pumping part comprises:
a first transistor having an input electrode receiving the first voltage, a control electrode connected to the level boosting part and an output electrode connected to a first node, the first transistor outputting the input voltage in response to a turn-on signal from the level boosting part during the low period of the first clock;
a first flying capacitor having a first terminal receiving the first clock and a second terminal connected to the first node, the first flying capacitor boosting an electric potential of the first node to the first voltage during the high period of the first clock;
a second transistor having an input electrode receiving the first voltage, a control electrode connected to the level boosting part and an output electrode connected to a second node, the second transistor outputting the input voltage in response to the turn-on signal from the level boosting part during the low period of the second clock; and
a second flying capacitor having a first terminal receiving the second clock and a second terminal connected to the second node, the second flying capacitor boosting an electric potential of the second node to the second voltage during the high period of the second clock.

2. The DC-DC converting circuit of claim 1, wherein the level boosting part comprises:
a third transistor having an input electrode receiving the ground voltage, a control electrode receiving the first clock and an output electrode connected to the control electrode of the first transistor, the third transistor controlling on/off of the first transistor in response to the first clock;
a fourth transistor having an input electrode receiving the ground voltage, a control electrode receiving the second clock and an output electrode connected to the control electrode of the second transistor, the fourth transistor controlling on/off of the second transistor in response to the second clock;
a fifth transistor having an input electrode connected to the control electrode of the first transistor, a control electrode connected to the second node and an output electrode connected to the output terminal, the fifth transistor controlling on/off of the first transistor in response to the electric potential of the second node; and
a sixth transistor having an input electrode connected to the control electrode of the second transistor, a control electrode connected to the first node and an output electrode connected to the output terminal, the sixth transistor controlling on/off of the second transistor in response to the electric potential of the first node.

3. The DC-DC converting circuit of claim 2, wherein the output part comprises:
a seventh transistor having an input electrode connected to the first node, a control electrode connected to the second node and an output electrode connected to the output terminal, the seventh transistor outputting the boosted first voltage in response to the electric potential of the second node; and
an eighth transistor having an input electrode connected to the second node, a control electrode connected to the first node and an output electrode connected to the output terminal, the eighth transistor outputting the boosted second voltage in response to the electric potential of the first node.

4. The DC-DC converting circuit of claim 3, wherein the first to eighth transistors comprise polysilicon PMOS transistors.

5. The DC-DC converting circuit of claim 1, wherein the input voltage has a voltage level equal to voltage levels of the high voltages of the first and second clocks, and the first and second voltages have a voltage level that corresponds to two times that of the input voltage.

6. The DC-DC converting circuit of claim 5, wherein the input voltage is higher than 0 volt.

7. A DC-DC converting circuit comprising N boosting circuits, where N is a constant number larger than 1,
each of the boosting circuits comprising:
a charge pumping part receiving an input voltage, a first clock and a second clock having a phase different than a phase of the first clock to output a first voltage boosted by a high voltage of the first clock with respect to the input voltage during a high period of the first clock and output a second voltage boosted by a high voltage of the second clock with respect to the input voltage during a high period of the second clock;
an output part outputting the first voltage from the charge pumping part to an output terminal during a low period of the second clock and outputting the second voltage from the charge pumping part to the output terminal during a low period of the first clock; and
a level boosting part providing an output voltage or a ground voltage from the output terminal to the charge pumping part to turn on or to turn off the charge pumping part in response to the first clock and the second clock,
wherein input terminals of N-(N−1)th to N-th boosting circuits among the N boosting circuits are connected to an output terminal of a previous boosting circuit to receive an output of the previous boosting circuit as the input voltage, wherein the charge pumping part comprises:
a first transistor having an input electrode receiving the input voltage, a control electrode connected to the level boosting part and an output electrode connected to a first node, the first transistor outputting the input voltage in response to a turn-on signal from the level boosting part during the low period of the first clock;
a first flying capacitor having a first terminal receiving the first clock and a second terminal connected to the first node, the first flying capacitor boosting an electric potential of the first node to the first voltage during the high period of the first clock;

a second transistor having an input electrode receiving the first voltage, a control electrode connected to the level boosting part and an output electrode connected to a second node, the second transistor outputting the input voltage in response to the turn-on signal from the level boosting part during the low period of the second clock; and a second flying capacitor having a first terminal receiving the second clock and a second terminal connected to the second node, the second flying capacitor boosting an electric potential of the second node to the second voltage during the high period of the second clock.

8. The DC-DC converting circuit of claim 7, wherein the level boosting part comprises:

a third transistor having an input electrode receiving the ground voltage, a control electrode receiving the first clock and an output electrode connected to the control electrode of the first transistor, the third transistor controlling on/off of the first transistor in response to the first clock;

a fourth transistor having an input electrode receiving the ground voltage, a control electrode receiving the second clock and an output electrode connected to the control electrode of the second transistor, the fourth transistor controlling on/off of the second transistor in response to the second clock;

a fifth transistor having an input electrode connected to the control electrode of the first transistor, a control electrode connected to the second node and an output electrode connected to the output terminal, the fifth transistor controlling on/off of the first transistor in response to the electric potential of the second node; and a sixth transistor having an input electrode connected to the control electrode of the second transistor, a control electrode connected to the first node and an output electrode connected to the output terminal, the sixth transistor controlling on/off of the second transistor in response to the electric potential of the first node.

9. The DC-DC converting circuit of claim 8, wherein the output part comprises:

a seventh transistor having an input electrode connected to the first node, a control electrode connected to the second node and an output electrode connected to the output terminal, the seventh transistor outputting the boosted first voltage in response to the electric potential of the second node; and an eighth transistor having an input electrode connected to the second node, a control electrode connected to the first node and an output electrode connected to the output terminal, the eighth transistor outputting the boosted second voltage in response to the electric potential of the first node.

10. The DC-DC converting circuit of claim 9, wherein the first to eighth transistors comprise polysilicon PMOS transistors.

11. The DC-DC converting circuit of claim 7, wherein the input voltage has a voltage level equal to voltage levels of the high voltages of the first and second clocks and higher than 0 volt, and the first and second voltages have a voltage level that corresponds to two times a voltage level of the input voltage.

12. A DC-DC converting circuit comprising:

a charge pumping part receiving an input voltage, a first clock and a second clock having a phase different than a phase of the first clock to output a first voltage lowered by a low voltage of the first clock with respect to the input voltage during a low period of the first clock and output a second voltage lowered by a low voltage of the second clock with respect to the first voltage during a low period of the second clock;

an output part outputting the first voltage from the charge pumping part to an output terminal during the low period of the first clock and outputting the second voltage from the charge pumping part to the output terminal during the low period of the second clock; and a level boosting part controlling a drive of the charge pumping part and the output part in response to the first clock and the second clock, wherein the charge pumping part comprises:

a first transistor having an input electrode receiving the input voltage, a control electrode connected to the level boosting part and an output electrode connected to a first node;

a first flying capacitor having a first terminal receiving the first clock and a second terminal connected to the first node, the first flying capacitor that lowers an electric potential of the first node to the first voltage in response to the first clock during the low period of the first clock;

a second transistor having an input electrode receiving the input voltage, a control electrode connected to the first node and an output electrode connected to a second node; and a second flying capacitor having a first terminal receiving the second clock and a second terminal connected to the second node, the second flying capacitor that lowers an electric potential of the second node to the second voltage in response to the second clock during the low period of the second clock.

13. The DC-DC converting circuit of claim 12, wherein the level boosting part comprises:

a third transistor having a control electrode connected to the second node, an input electrode receiving the input voltage and an output electrode connected to a third node;

a third flying capacitor having a first terminal receiving the first clock and a second terminal connected to the third node;

a fourth transistor having a control electrode connected to the first node, an input electrode receiving the input voltage and an output electrode connected to a fourth node; and a fourth flying capacitor having a first terminal receiving the second clock and a second terminal connected to the fourth node.

14. The DC-DC converting circuit of claim 13, wherein the output part comprises:

a fifth transistor having a control electrode connected to the third node, an input electrode connected to the first node and an output electrode connected to the output terminal, the fifth transistor outputting the lowered first voltage in response to an electric potential of the third node; and a sixth transistor having a control electrode connected to the fourth node, an input electrode connected to the second node and an output electrode connected to the output terminal, the sixth transistor outputting the lowered second voltage in response to an electric potential of the fourth node.

15. The DC-DC converting circuit of claim 12, wherein the input voltage is equal to 0V.

16. A display apparatus comprising:

an array substrate comprising a base substrate, a pixel array formed onto the base substrate to display an image in response to a gate signal and a data signal, a gate driving circuit formed onto the base substrate adjacent the pixel array to generate the gate signal, and a first DC-DC converting circuit formed onto the base substrate to boost an input voltage to a first driving voltage for the gate driving circuit and output the first driving voltage;

an opposite substrate combined with the array substrate; and a driving chip mounted on the array substrate to provide the data signal, a gate control signal and the input voltage to the pixel array, the gate driving circuit and the first DC-DC converting circuit, respectively, the first DC-DC converting circuit comprising:

a charge pumping part receiving the input voltage, a first clock and a second clock having a phase different than a phase of the first clock to output a first voltage boosted by a high voltage of the first clock with respect to the input voltage during a high period of the first clock and output a second voltage boosted by a high voltage of the second clock with respect to the input voltage during a high period of the second clock;

an output part outputting the first voltage from the charge pumping part to an output terminal as the first driving voltage during a low period of the second clock and outputting the second voltage from the charge pumping part to the output terminal as the first driving voltage during a low period of the first clock; and a level boosting art providing the first driving voltage or a ground voltage to the charge pumping part to turn on or to turn off the charge pumping part in response to the first clock and the second clock, wherein the driving chip comprises:

a memory;

a timing controller receiving a control signal and image data, reading the image data from and writing the image data to the memory, and changing the control signal into the gate control signal and a data control signal to output the gate control signal and the data control signal;

a data driving circuit changing the image data read out from the memory into the data signal in response to a second driving voltage and the data control signal to output the data signal; and a second DC-DC converting circuit changing a power supply voltage from an exterior into the input voltage and the second driving voltage to provide the input voltage and the second driving voltage to the first DC-DC converting circuit and the data driving circuit, respectively.

17. The display apparatus of claim 16, wherein the pixel array, the gate driving circuit and the first DC-DC converting circuit comprise polysilicon PMOS structures, and the pixel array, the gate driving circuit and the first DC-DC converting circuit are substantially simultaneously formed onto the base substrate through a same thin film process.

* * * * *